United States Patent [19]
Funakubo

[11] 3,807,051
[45] Apr. 30, 1974

[54] ADJUSTMENT MEANS FOR THE TOOLING OR MACHINING ANGLE IN TOOLING OR MACHINING OPERATIONS

[75] Inventor: Shinnosuke Funakubo, Tokyo, Japan

[73] Assignee: Kabushiki-Kaisha Eishin, Tokyo, Japan

[22] Filed: Aug. 10, 1972

[21] Appl. No.: 279,620

[52] U.S. Cl. .................................... 33/334, 408/16
[51] Int. Cl. ........................................... G01c 9/28
[58] Field of Search ...................... 408/16; 33/334

[56] References Cited
UNITED STATES PATENTS

| | | | |
|---|---|---|---|
| 2,452,930 | 11/1948 | Ivey | 33/334 X |
| 3,664,032 | 5/1972 | Tompkins | 33/334 |
| 450,457 | 4/1891 | Green | 33/334 X |
| 2,802,380 | 8/1957 | Fossheim | 408/16 |

OTHER PUBLICATIONS
F. W. Fromm, American Machinist, Vol. 88, No. 3, p. 102, Feb. 3, 1944.

*Primary Examiner*—Andrew R. Juhasz
*Assistant Examiner*—Z. R. Bilinsky
*Attorney, Agent, or Firm*—Shlesinger, Fitzsimmons & Shlesinger

[57] ABSTRACT

Adjustment means is provided for adjusting the tooling or machining angle, especially the boring angle of tooling devices. Said adjustment means is secured to the device proper and comprises a level carried by a lever which is pivoted between two discs having angular graduations on their rim portions for setting the angular position of the lever about a first axis. Also, the level is rotatably adjustable on the lever about a second axis extending perpendicular to the first axis, whereby the tooling angle can be accurately set relative to vertical and horizontal axes, that is, three-dimensionally.

3 Claims, 3 Drawing Figures

PATENTED APR 30 1974 3,807,051

ADJUSTMENT MEANS FOR THE TOOLING OR MACHINING ANGLE IN TOOLING OR MACHINING OPERATIONS

This invention relates to a device for adjusting the tooling or machining angle of various tooling and machining devices such as drilling, boring, reaming and trepanning devices and the like. More particularly, it relates to a device for adjusting a hand drill boring angle by means of which the boring angle can be indicated and maintained to a predetermined value during a boring operation.

When boring a sheet- or plate- like material with relatively small thickness with use of hand drills, the boring operation is not affected adversely by the boring angles. When boring work of relatively large thickness, however, the various boring angles are retained in the form of angles of inclination of the drilled holes. Therefore, the boring angles must be set to the desired values as necessity may demand. In addition, the drill is liable to break no matter whether the hole is bored vertically or obliquely, unless the boring angle be set or held to a predetermined value. However, the known types of boring devices are not fitted with proper indicating devices for the boring angles, and the worker's skill. Thus, the correct boring angles are set only with considerable difficulty. Moreover, unless the proper pressure is applied when the drill has advanced into the work to a more or less extent, the drill is liable to break, and the fragments of the drills are embedded frequently into the work to be drilled, thus giving rise to considerable difficulty in the removal of such fragments.

With this in view, the present invention provides a device for adjusting the boring angles for hand drills which enables the boring angle to be set to a predetermined value and simultaneously enables the thus set boring angle to be maintained in the course of the boring operation.

A preferred embodiment of the present invention will now be described hereafter by reference to the accompanying drawing.

Figure 1:
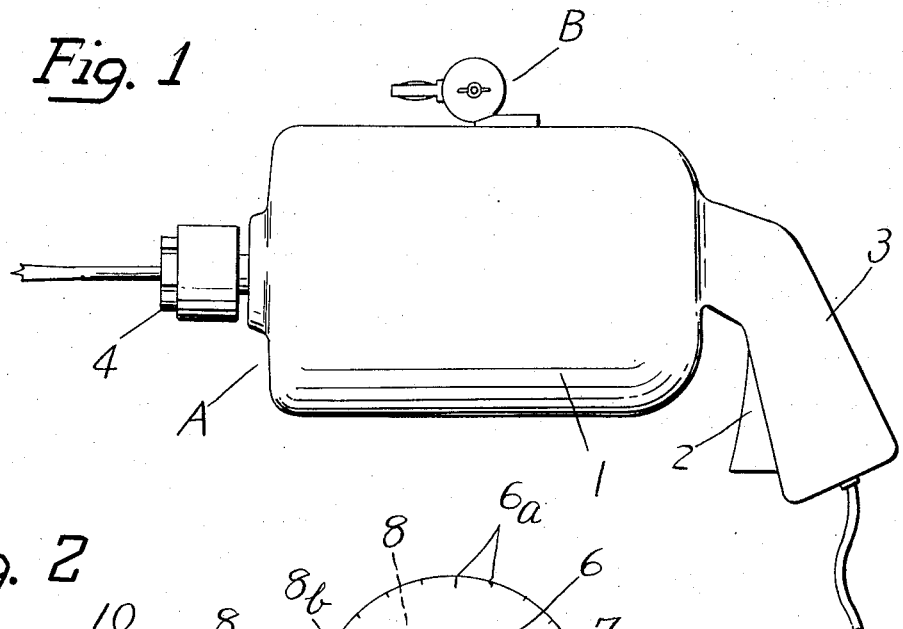
FIG. 1 is a side elevation of a hand drill provided with the present adjustment unit.
Figure 2:
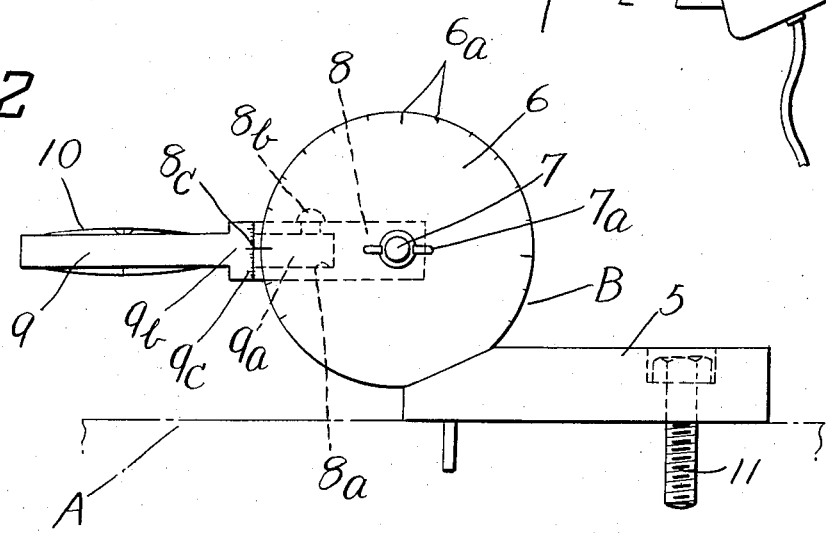
FIG. 2 is a fragmentary, enlarged side elevation showing the adjustment section for the boring angle.
Figure 3:
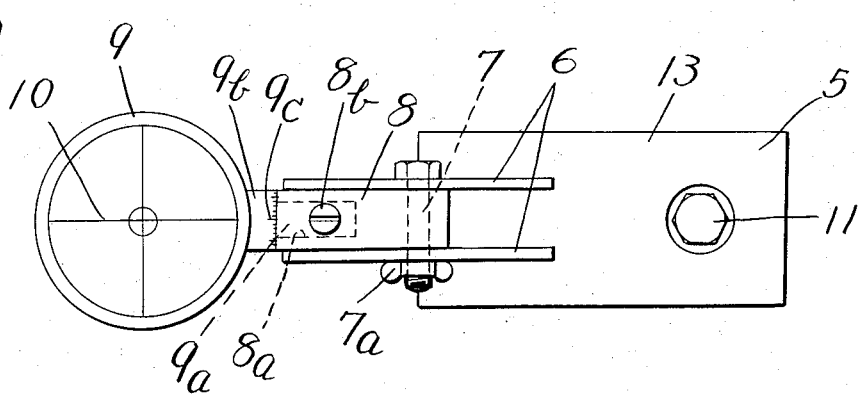
FIG. 3 is a plan view thereof.

In the drawing, A denotes generally a hand drill comprising a body member 1 enclosing an electric motor in a known manner, a handle 3 formed integrally to the rear of the body member 1 and having an electrical switch means 2, and a chuck 4 mounted rotatably to the front of the body member 1. B denotes in general a unit for adjustment of the drill boring angles comprising a base member 5, two upright indicating discs 6 secured thereto and a pivotal lever 8 carried between said discs 6 by means of a spindle 7 and a nut 7a. Said lever 8 has a bore 8a in its end extremity in which is rotatably received the base projection 9a of a retainer 9 for a level indicator, which is secured in the desired angular position by means of a set screw 8b which threads into the tapped hole on lever 8 to engage the said projection 9a. The peripheries of the indicating discs 6 are marked with graduations 6a which stand for possible angular positions of lever 8, while the lever 8 is marked with a reference line 8c readable against graduations 6a; and the rim 9b of the retainer 9 is likewise marked with angular divisions 9c which are readable against line 8c, and which stand for the possible angular position of retainer 9 about the axis of the bore 8a in lever 8. A level indicator 10 is secured in the retainer 9 with its axis disposed at right angles to the base projection 9a.

When using the present device, the lever 8 is turned partially until the reference line 8c registers with the desired graduation 6a on the graduated disc 6, and is secured in this position by tightening the nut 7a for setting the boring angle. When carrying out the boring operation, the body member of the hand drill is carried and held relative to the work so that the level indicator 10 is kept in the level or horizontal position. The boring operation can then be positively effected at the desired angle. As the case may be, the body member of the hand drill may have to be held obliquely for carrying out the boring operation at hand. In this case, the retainer 9 for the level indicator 10 is turned partially relative to the lever 8, and is adjusted in its angular position so that the zero line on its rim 9 is shifted away from its normal position of alignment with the reference line 8c until the desired reading on the rim 9b registers with the reference line 8c. With the retainer 9 thus adjusted in its angular position suited for the oblique boring operation at hand, it is secured in this position by tightening the screw rod 8b. The adjustment unit B is secured as a whole to the body member A of the hand drill by a bolt 11.

According to the present invention, as described above, two indicating discs are mounted upright on the mounting base of the unit, which is fastened to the drill proper, and a lever is rotatably and adjustably mounted between said discs. The foremost part of the lever carries in turn a rotatably adjustable retainer member for the level indicator, and the rim portions of the said discs and retainer member are marked with graduations which stand for the angle reading. In this way, the boring angle can be set accurately to the desired value on the vertical and horizonal axes, according to which the boring operation can be carried out easily and positively. The breakage of the drill can thus be reduced to the minimum.

It will be seen that, according to the present device, the boring angle can be accurately set on the vertical and horizontal axes, that is, three-dimensionally in contradistinction to the prior devices wherein the level indicator fulcrumed at one end is moved along the graduation lines which stand for the angle and thus the setting of the boring angle can be performed only two-dimensionally.

Though the explanation of the invention has been given in the above with reference to an embodiment describing a hand drill provided with the present inventive device, said device can equally be utilized with other various tooling or machining devices such as reaming and trepanning tools and the like.

What is claimed:

1. An adjustable device for indicating the desired tooling angle of the bit in a power tool, and the like, comprising support means adapted to be secured to the body of a tool, a first member mounted on said support means for angular adjustment thereon about a first axis that extends at right angles to the bit in the tool to which the support means is attached, a second member rotatably mounted on said first member for angular adjustment thereon about a second axis disposed at right angles to said first axis, and a level secured on said second member for movement therewith, and having its axial centerline extending at right angles to said first and second axes, and offset from said first axis, said support means having thereon a first plurality of spaced graduations angularly spaced about said first axis, said second member having thereon a second plurality of spaced graduations angularly spaced about said second axis, and said first member having thereon a reference mark located between and simultaneously readable against both said first and second pluralities of graduations thereby to adjust said level into a horizontal plane, when the bit in the associated tool is disposed at the desired tooling angle.

2. An adjustable device as defined in claim 1, wherein said support means comprises a pair of spaced discs having a pivot pin extending coaxially therebetween, and having thereon said first plurality of graduations adjacent their peripheral surfaces, said first member is pivoted at one end on said pin, said second member has a cylindrical shank rotatably mounted in an axial bore in the opposite end of said first member and has said second plurality of graduations arranged around a peripheral rim portion adjacent the junction with said first member, and said reference mark is formed on said first member adjacent said opposite end thereof.

3. An adjustable device for indicating the desired tooling angle of a bit in a power tool such as a drilling, boring, reaming or trepanning tool, comprising a base adapted to be secured to the body of the tool, a pair of discs mounted upright on said base in spaced, coaxial relation, a pivotal lever mounted adjacent one end between said discs to pivot about the common axis of said discs and having thereon a reference mark, a retainer member rotatably mounted on the opposite end of said lever for angular adjustment thereon about a second axis which intersects said common axis at right angles, and a level mounted on said retainer member for adjustment therewith about said axes, and having its centerline offset from said common axis, said retainer member and one of said discs having thereon a plurality of graduations angularly spaced about said second axis and said common axis, respectively, and simultaneously readable against said reference mark on said lever to position said level in a predetermined position in which it lies in a horizontal plane when the bit in said tool is held at the desired tooling angle.

* * * * *